(12) United States Patent
Talbot et al.

(10) Patent No.: US 7,256,627 B1
(45) Date of Patent: Aug. 14, 2007

(54) ALIGNMENT OF LOCAL TRANSMIT CLOCK TO SYNCHRONOUS DATA TRANSFER CLOCK HAVING PROGRAMMABLE TRANSFER RATE

(75) Inventors: Gerald Robert Talbot, Concord, MA (US); Richard W. Reeves, Westboro, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 52 days.

(21) Appl. No.: 11/033,755

(22) Filed: Jan. 13, 2005

(51) Int. Cl.
*H03L 7/00* (2006.01)

(52) U.S. Cl. .................. 327/141; 327/146; 327/151
(58) Field of Classification Search .............. None
See application file for complete search history.

(56) References Cited

U.S. PATENT DOCUMENTS

| | | | | |
|---|---|---|---|---|
| 4,637,018 A | * | 1/1987 | Flora et al. | 714/700 |
| 6,182,236 B1 | * | 1/2001 | Culley et al. | 713/503 |
| 6,249,189 B1 | * | 6/2001 | Wu et al. | 331/18 |
| 6,861,867 B2 | * | 3/2005 | West et al. | 326/38 |
| 6,861,886 B1 | * | 3/2005 | Ludden et al. | 327/156 |
| 2006/0062341 A1 | * | 3/2006 | Edmondson et al. | 375/376 |

OTHER PUBLICATIONS

"AMD-3181™ HyperTransport™ PCI-X® Tunnel Data Sheet", 24637 Rev. 3.02, Aug. 10, 2004, pp. 1-87.

* cited by examiner

*Primary Examiner*—Quan Tra
*Assistant Examiner*—An T. Luu
(74) *Attorney, Agent, or Firm*—Manelli Denison & Selter PLLC; Leon R. Turkevich

(57) ABSTRACT

A phase alignment circuit having a phase selection circuit, a synchronizer, and a counter form a feedback loop for aligning a local clock signal with a received reference clock of a synchronous communications system. The phase selection circuit is configured for outputting the local clock signal as a phase-adjusted local clock having a selected phase based on a phase selection value specified by the counter. The synchronizer is configured for digitally sampling the received reference clock relative to the phase-adjusted local clock, and outputting a digital phase bit identifying whether the phase-adjusted local clock has a later phase relative to the received reference clock. The counter selectively increments or decrements a counted value based on the digital phase bit, and outputs to the phase selection circuit a prescribed number of most significant bits from the counted value as the phase selection value.

15 Claims, 8 Drawing Sheets

ALIGNMENT OF LOCAL TRANSMIT CLOCK TO SYNCHRONOUS DATA TRANSFER CLOCK HAVING PROGRAMMABLE TRANSFER RATE

BACKGROUND OF THE INVENTION

1. Field of the Invention

The present invention is directed to synchronizing a local clock relative to a reference clock that is supplied for synchronous data transfers, for example a PCI clock. More particularly, the present invention relates to use of digital phase shifting systems for outputting a phase-shifted signal that is synchronized relative to a reference clock.

2. Background Art

Newer communications systems require advanced processing of high speed digital signals in order to accommodate precise timing requirements. For example, processor-based communications systems use high-speed (e.g., 1.6 Gbits/sec and above) source synchronous data communications systems, such as HyperTransport™ bus architectures, and synchronous systems such as Peripheral Component Interconnect (PCI) bus systems.

Synchronous communications systems, such as PCI transmission systems, rely on a common time base for synchronization of local clocks of respective transmitting and receiving devices. For example, a PCI bus master device transmits data to a PCI bus slave device based on an external clock, typically which is supplied by an external source. Hence, the PCI bus master device is required to transmit data in a manner that is aligned relative to the external clock within a prescribed tolerance interval, and the receive device is required to latch the incoming data within a prescribed time interval relative to the external clock.

Existing PCI specifications have prescribed timing requirements between the reference clock and the transmission of transmit data. In particular, existing PCI specifications impose a requirement that valid transmit data be output within a prescribed time interval of the rising clock edge of the reference clock at the interface of the transmitter; in other words, transmitters have limited time constraints (having minimum and maximum time interval boundaries) from the rising edge of the clock to when the data must transition on the PCI bus. Hence, a transmitter needs to output valid data within about 3 nanoseconds of the rising edge of the reference clock; however, internal propagation delays within the integrated circuit of the transmitter may cause the delay between the rising edge of the reference clock, and the instance at which output data can be driven onto the bus, to be up to 6-8 nanoseconds. Hence, the phase of the clock used to transmit the data must be adjusted to be earlier than the reference clock.

The existing PCI specifications also specify that for the receiver, data that changes within a certain window about the rising edge of the reference clock must be sampled correctly by the receiving device (e.g., sampling and holding the data on the bus within 2-3 nanoseconds). Consequently, the transmitter and the receiver must follow stringent timing requirements.

Prior art devices have relied on an analog phase locked loop (PLL) to phase align their local clocks to the external clock. For example, the PLL typically includes a phase comparator that is used to directly compare a reference clock to a locally-generated clock signal, also referred to herein as the feedback clock signal: the phase comparator outputs a phase difference signal to a low pass filter, which outputs the filtered signal to a voltage controlled oscillator. The voltage controlled oscillator outputs a clock signal based on the phase difference signal to a buffer circuit. The buffer circuit outputs the feedback clock signal back to the phase comparator, and also outputs the feedback clock signal to output buffers configured for outputting respective data values onto a data bus synchronous with the feedback clock signal.

One particular disadvantage of prior art phase locked loops is that they are sensitive to the frequency of the reference clock; hence, PLLs tend to have a limited frequency range. However, newer PCI bus protocols require PCI bus circuitry to be able transmit over a reference clock frequency range of as low as 1 MHz or lower, to over 133 MHz, resulting in a frequency range of over one decade that cannot be readily accommodated by a conventional PLL. Such a large frequency range requires conventional PLLs to be modified to include feedback dividers that utilize different clock frequencies, resulting in additional sources for timing errors. Hence, the prior art phase locked loops require increased complexity in order to handle the wider frequency range.

In addition, attempts at deskewing (i.e., phase aligning) the transmitter and receiver becomes more difficult as the frequency of the signal increases, since the phase skew increases proportionally with an increase in the increase in frequency.

Another example of phase adjustment involves use of digital delay lines configured for locking to the incoming reference clock frequency, for example by delaying a locally-controlled signal by 90 percent of its cycle, i.e., to obtain an earlier clock edge. However, such digital delay lines when implemented using the requisite inverter have a resolution limited to about 50-60 picoseconds, resulting in the disadvantage of having a relatively low degree of precision, limited accuracy, and a limited frequency range. Consequently, digital delay lines have a limited ability to provide precise phase adjustments.

In addition, digital phase shifting systems in an integrated circuit often rely on binary coding, where a digital value composed of N bits has a range of values from zero to $2^N-1$. Reliance on binary coding suffers from the disadvantage of Most Significant Bit (MSB) rollover, where a simultaneous transition in multiple bits due to a change in value (e.g., "7"=0111 to "8"=1000) creates numerous discontinuities in the circuits implementing the digital system, resulting in voltage spikes that may cause transient phase errors on the output signal; such voltage spikes may cause transient phase errors that may result in misinterpretation of a clock strobe, data, etc., resulting in errors due to instability of the output signal. Efforts to filter the voltage spikes, or the transient phase errors, from the output signal often are not practical in integrated circuits due to the added delay or the increased capacitance.

In addition, implementation of digital phase shifting systems in an integrated circuit may encounter errors due to nonlinearities due to process variations encountered during manufacture of the integrated circuit.

Finally, digital phase shifting systems may suffer from the problem of adding a bias to the reference clock signal that may affect the duty cycle of the output signal.

SUMMARY OF THE INVENTION

There is a need for an arrangement that enables precise control within an integrated circuit of phase selection for phase alignment of a local clock signal with an external reference clock signal.

There also is a need for an arrangement that enables a digital phase alignment circuit to provide precise phase alignment between a local clock signal and an external reference clock signal, without generation of noise spikes or voltage spikes due to transitions in digital values.

There also is a need for an arrangement that enables each transmit and receive device in a synchronous system, implemented as a corresponding integrated circuit and configured for sending/receiving data according to a corresponding detected synchronous reference clock signal at a corresponding device interface, to digitally align (i.e., deskew) its corresponding local clock phase to the corresponding detected synchronous reference clock signal in order to minimize skewing of the corresponding local clock phase.

These and other needs are attained by the present invention, where an integrated circuit includes a phase alignment circuit having a phase selection circuit a synchronizer, and a counter forming a feedback loop for aligning a local clock signal with a received reference clock of a synchronous communications system. The phase selection circuit is configured for outputting the local clock signal as a phase-adjusted local clock having a selected phase based on a phase selection value specified by the counter. The synchronizer is configured for digitally sampling the received reference clock relative to the phase-adjusted local clock, and outputting a digital phase bit identifying whether the phase-adjusted local clock has a later phase relative to the received reference clock. The counter selectively increments or decrements a counted value based on the digital phase bit, and outputs to the phase selection circuit a prescribed number of most significant bits from the counted value as the phase selection value. Hence, the phase alignment circuit provides precise phase alignment between the phase-adjusted local clock and the received reference clock ensuring precise synchronous transmission and reception of data using the phase-adjusted local clock.

One aspect of the present invention provides an integrated circuit having a phase alignment circuit. The phase alignment circuit includes a phase selection circuit, a synchronizer, and a counter. The phase selection circuit is configured for outputting the local clock signal as a phase-adjusted local clock having a selected phase based on a phase selection value. The synchronizer is configured for digitally sampling a received reference clock of a synchronous communications system relative to the phase-adjusted local clock, and outputting a digital phase bit identifying whether the phase-adjusted local clock has a later phase relative to the received reference clock. The counter is configured for selectively performing one of incrementing and decrementing a counted value based on the digital phase bit, the counter configured for outputting to the phase selection circuit a prescribed number of most significant bits from the counted value as the phase selection value, the phase selection circuit configured for aligning the phase-adjusted local clock toward the received reference clock based on the phase selection value.

An additional feature of the present invention is that the phase selection circuit includes a selection circuit, binary weighted current sources, and an amplifier circuit. The phase selection circuit is configured for selecting adjacent phase signals from a number of equally-spaced phases of the local clock signal, based on the phase selection value. The selection circuit outputs the adjacent phase signals to respective first and second binary weighted current sources, along with a digital interpolation value. The first current source outputs a contribution current onto a summing node based on the first adjacent phase signal and the digital interpolation control value, and the second current source outputs a second contribution current to the summing node based on the second adjacent phase signal and an inverse of the digital interpolation control value, resulting in an interpolated signal. An amplifier circuit outputs the interpolated signal as a phase-interpolated clock signal according to the phase selection value.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like element elements throughout and wherein.

BEST MODE FOR CARRYING OUT THE INVENTION

The disclosed embodiment is directed to an integrated circuit, for example a PCI bridge device, phase alignment circuit for aligning a locally-generated clock to a received reference clock, for precise transmission and reception of data in a synchronous system.

Overview

Figure 1:
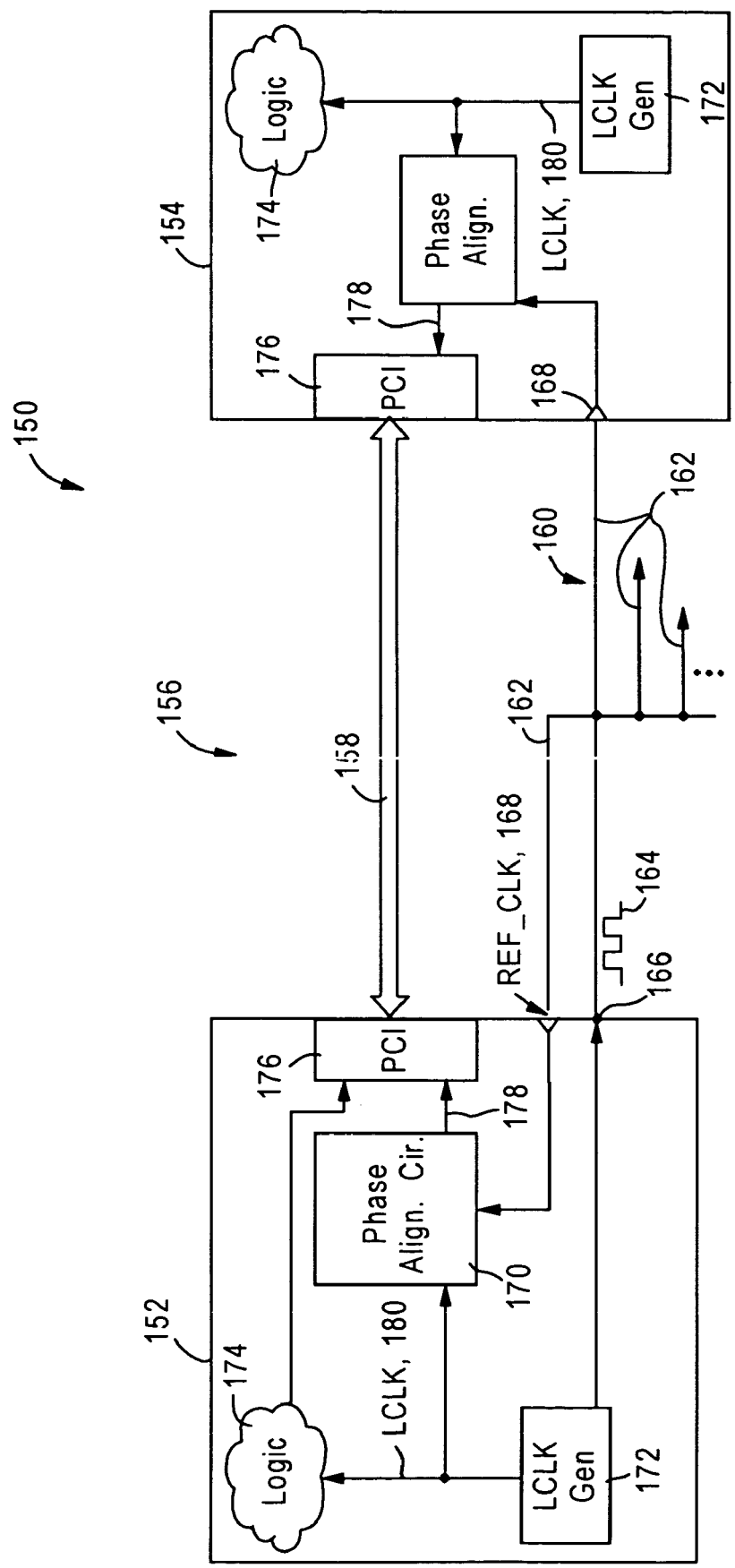
FIG. 1 is a block diagram illustrating a synchronous system having a transmitter and a receiver implemented as respective discrete integrated circuit chips and configured for phase-aligning respective local clock signals, relative to a received reference clock for synchronous communications, according to an embodiment of the present invention.

FIG. 1 is a diagram illustrating a synchronous system 150 having a transmitter 152, a receiver 154, and a bus system 156 interconnecting the transmitter 152 and the receiver 154. The bus system 156, for example a PCI bus, includes address (and/or data) lines 158 and a clock line 160 configured for supplying a reference clock 164. As illustrated in FIG. 1, the clock line 160, implemented for example as a trace on a PC board, has a plurality of distribution lines 162 that have the same prescribed length relative to an output node 166 of the source of the reference clock 164, enabling each device 152 and 154 on the bus 156 to receive the same received reference clock (REF_CLK) 168 having encountered the same propagation delay.

Hence, the output reference clock 164 is output from the integrated circuit 152 at an output node (e.g., a pad, pin, or solder ball) 166 and is synchronous with the local clock signal (LCLK) 180. The local clock generator 172 may include a divider circuit configured for outputting the output reference clock 164 based on dividing the local clock signal 180 to a lower frequency. The received reference clock (REF_CLK) 168 is the reference clock 164 having encountered the prescribed propagation delay based on the corresponding prescribed length of the signal traces 162.

As illustrated in FIG. 1, each integrated circuit 152 and 154 includes a phase alignment circuit 170, a local clock generator 172, data transmit and receive logic 174 configured for generating and receiving data from the bus 158, and a bus interface (e.g., a PCI Bus interface) 176. As apparent in the art, the logic 174 may include a divider circuit for dividing the local clock signal (LCLK) 180 to a lower frequency. As described below with respect to FIG. 2, the phase alignment circuit 170 is configured for generating a phase-adjusted local signal (PHI_X) having its phase aligned relative to the received reference clock (REF_CLK) 168; the phase-adjusted local signal (PHI_X) is selectively divided to a selected frequency corresponding to a selected I/O transfer rate, and the divided signal is buffered and output as a frequency-selected clock signal 178 to the bus interface 176. Hence, the bus interface 176 is configured for transmitting and receiving data according to a frequency-selected clock signal 178 having a phase coincident with the internally-generated phase-adjusted local signal (PHI_X).

Phase Alignment Circuit

Figure 2:
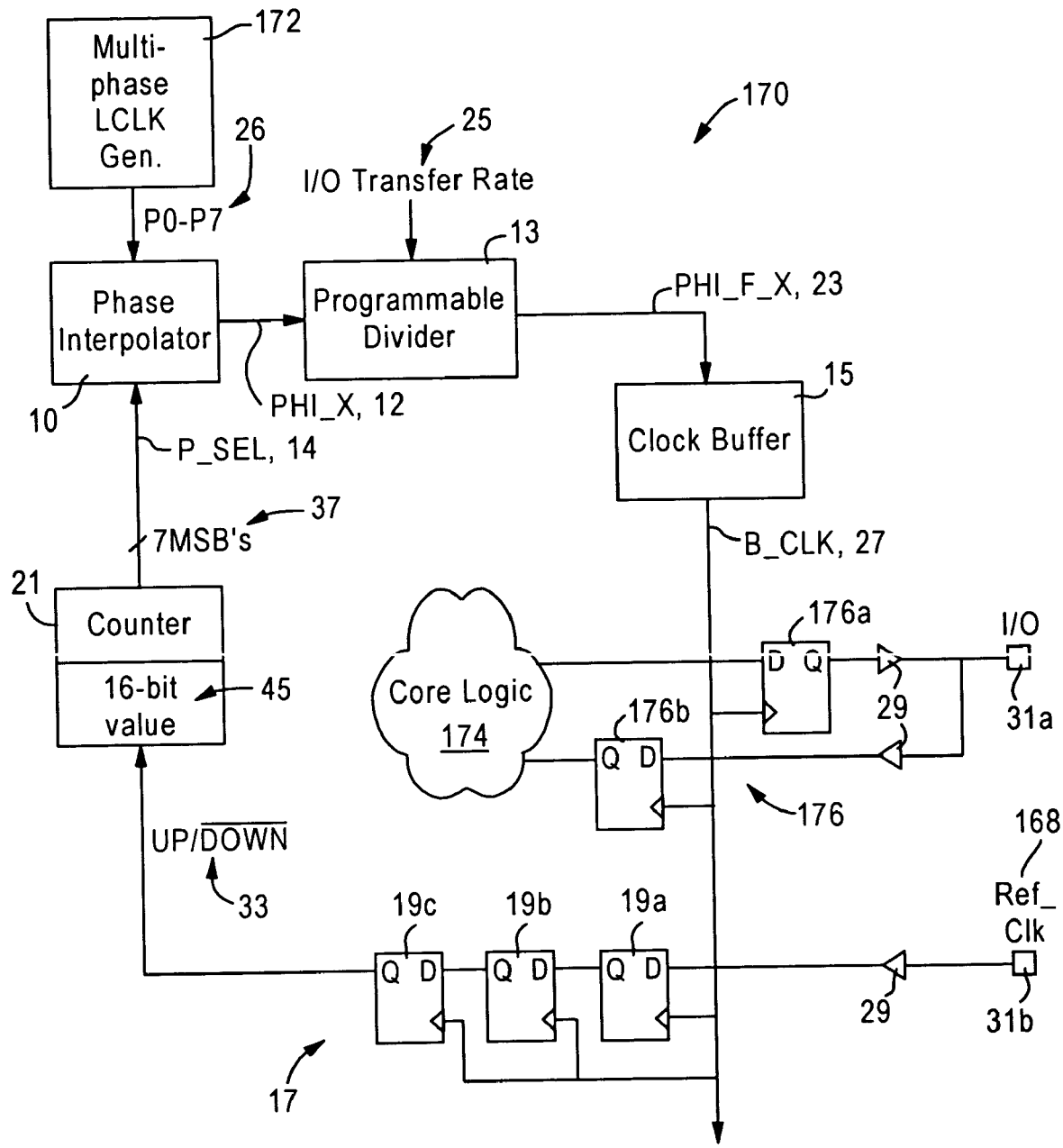
FIG. 2 is a diagram illustrating in detail the phase alignment circuit in each of the transmitter and receiver of FIG. 1, according to an embodiment of the present invention.

FIG. 2 is a diagram illustrating the phase alignment circuit 170 according to an embodiment of the present invention. The phase alignment circuit 170 includes a phase selection circuit 10, a programmable divider 13, a buffer circuit 15, a synchronizer 17 composed of positive edge triggered D-type flip flops (DFF) 19*a*, 19*b*, and 19*c*, and an up/down counter 21.

The phase selection circuit 10, also referred to as a phase interpolator, is configured for receiving a plurality of equally-spaced local clock signals P0-P7 26 from the multiphase local clock generator 172, each being the same local clock signal (LCLK) 180 and having a corresponding phase offset, described in detail below with respect to FIG. 4. The frequency of the local clock (LCLK) 180 is preferably 1.6 GHz. As described in detail below with respect to FIGS. 3-9, the phase selection circuit 10 is configured for outputting a local clock signal (LCLK) as a phase-adjusted local clock (PHI_X) 12 having a selected phase based on a phase selection value (P_SEL) 14. Moreover, the phase selection circuit 10 is configured for selecting the phase of the phase-adjusted local clock signal PHI_X 12 from among one hundred twenty-eight (128) phases of the 1.6 GHz local clock signal (LCLK), providing an alignment resolution of 4.8 picoseconds (ps), well within the margin of any jitter that would be present on the received reference clock (REF_CLK) 168.

The programmable divider circuit 13 is configured for dividing the phase-adjusted local clock signal (PHI_X) 12 into a frequency-selected clock signal (PHI_X) 23, based on a prescribed I/O transfer rate input 25. In particular, the I/O transfer rate input 25 identifies if the phase-adjusted local clock signal (PHI_X) 12 should be divided by a factor of 1 (i.e., no division), 2, 4, 8, 16, etc. Hence, the frequency-selected clock signal 23 has a phase coincident with the phase-adjusted local clock signal 12 and a frequency matching the frequency of the received reference clock 168.

The clock buffer circuit 15 is configured for electrically buffering the frequency-selected clock signal (PHI_F_X) 23 as a buffered clock input (B_CLK) 27 for driving multiple devices, including the flip-flops 19*a*, 19*b*, and 19*c*, as well as to the bus registering circuitry 176, illustrated as transmit flip-flop 176*a* and receive flip-flop 176*b* coupled via buffers 29 to I/O pin 31*a*. The buffered clock signal (B_CLK) 27 is equivalent to the frequency-selected clock signal 178 of FIG. 1.

The synchronizer circuit 17 is configured for digitally sampling the received reference clock (REF_CLK) 168 received by the integrated circuit 152 at pin 31*b*. In particular, each flip-flop 19*a*, 19*b*, and 19*c* is configured for sampling the corresponding input (e.g., the received reference clock (REF_CLK) 168, the output of flip-flop 19*a*, and the output of flip-flop 19*b*) in response to the rising edge of the buffered clock (B_CLK) 27 that is generated to have the same phase as the phase-adjusted local clock signal (PHI_X) 12; as such, each corresponding input of the DFFs 19*a*, 19*b*, and 19*c* is sampled "relative to" the phase-adjusted local clock signal (PHI_X) 12.

The synchronizer circuit 17 is configured for outputting a digital phase bit (UP/DOWN) 33 identifying whether the phase-adjusted local clock has a later phase relative to the received reference clock; in other words, if the positive edge of the buffered clock input (B_CLK) 27 occurs before the positive edge of the received reference clock (REF_CLK) 168, the digital phase bit (UP/DOWN) 33 will have a value of "1"; however, if the positive edge of the buffered clock input (B_CLK) 27 occurs after the positive edge of the received reference clock (REF_CLK) 168, the digital phase bit (UP/DOWN) 33 will have a value of "0".

The counter 21 is configured for selectively either incrementing or decrementing a 16-bit counted value 45 based on the digital phase bit (UP/DOWN) 33: if the digital phase bit 33 has a value of "1", the counter 21 increments the value 45, and if the digital phase bit 33 has a value of "0", the counter 21 decrements the value 45. In addition, the counter 21 is configured for outputting to the phase selection circuit 10 the most significant seven (7) bits 37 from the 16-bit counted value 45 as the phase selection value (P_SEL) 14.

As apparent from the foregoing, the phase selection circuit 10 is configured for aligning the phase-adjusted local clock 12 toward the received reference clock 168 based on the phase selection value. Hence, an increase in the selection value 14 (indicating that over time the positive edge of the buffered clock input (B_CLK) 27 occurs before the positive edge of the received reference clock (REF_CLK) 168) causes the phase selection circuit 10 to adjust the phase to "pull back" the phase of the phase-adjusted local clock 12 closer toward the edge of the received reference clock 168; conversely, a decrease in the selection value 14 (indicating that over time the positive edge of the buffered clock input (B_CLK) 27 occurs after the positive edge of the received reference clock (REF_CLK) 168) causes the phase selection circuit 10 to adjust the phase to "push forward" the phase of the phase-adjusted local clock 12 closer toward the edge of the received reference clock 168.

Since the programmable divider 13 may output the signal PHI_F_X 23 at a lower frequency than the signal PHI_X 12, the phase interpolator 10 will continue to rotate the phase of the signal PHI_X 12 to align the phase of the signal B_CLK 27 with the reference clock 168.

If the clock edges of the buffered clock B_CLK 27 and the reference clock 168 are substantially in alignment, the synchronizer 17 will resolve metastable values encountered in the first flip-flop 19a. In particular, the first flip-flop 19a may enter a metastable state, where its output to 19b may be a metastable voltage (i.e., between voltage thresholds defining respective logical values): the successive DFFs 19b and 19c provide a bias toward a prescribed voltage threshold for a corresponding digital value for any metastable value output by the first flip-flop 19a, enabling the synchronizer 17 to resolve any metastability in the flip-flop 19 due to the coincident edges of the received reference clock 168 and the buffered signal (B_CLK) 27 that is derived from the phase-adjusted local clock signal (PHI_X) 12.

As apparent from the foregoing, if the clock edges of the buffered clock B_CLK 27 and the reference clock 168 are substantially in alignment, then statistically the digital phase bit (UP/DOWN) 33 will have an even distribution in terms of being either a "1" or a "0", resulting in no change in the phase selection value (P_SEL) 14. As described above, however, a shift in the relative positions of the clock edges will change the value of the phase selection value (P_SEL) 14, creating a bias for the phase interpolator 10 to align the phase of the phase-adjusted local clock (PHI_X) 12 (and consequently the buffered clock (B_CLK) 27) back toward the received reference clock (REF_CLK 168).

Additional details of the phase interpolator 10 are described in commonly-assigned, copending application Ser. No. 11/033,641, filed Jan. 13, 2005 (even date herewith), entitled BINARY CONTROLLED PHASE SELECTOR WITH OUTPUT DUTY CYCLE CORRECTION, the disclosure of which is incorporated in its entirety herein by reference.

A description will now be provided of the phase selection circuit 10, according to an embodiment of the present invention.

Phase Selection Circuit

Figure 3:
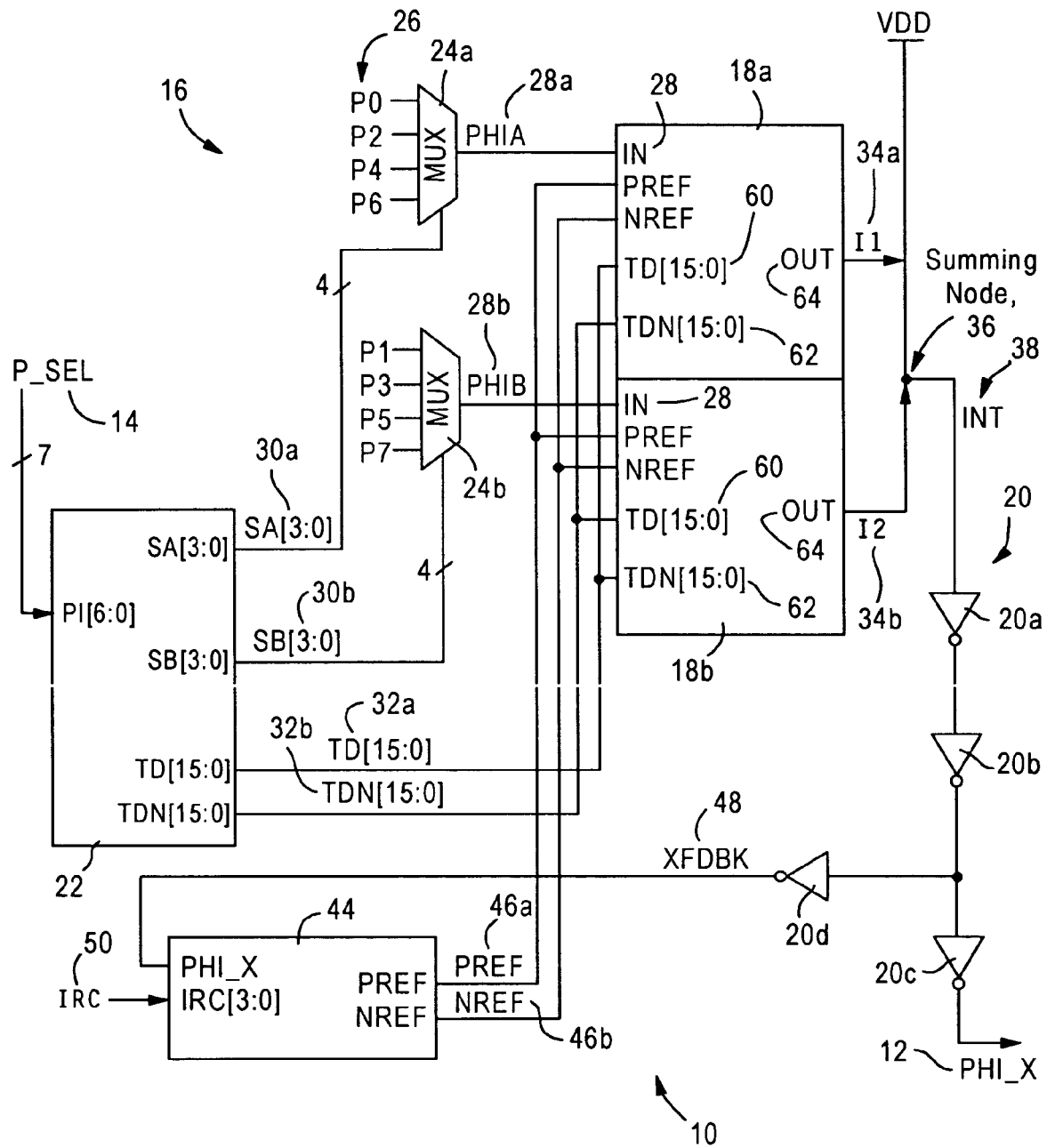
FIG. 3 is a block diagram illustrating the phase selection circuit of FIG. 2 according to an embodiment of the present invention.

FIG. 3 is a diagram illustrating the phase selection circuit 10, also referred to as a binary controlled phase generator, configured for generating the phase-adjusted local clock signal (PHI_X) 12. The phase selection circuit 10 generates the signal 12 to have a selected phase according to a phase selection value (P_SEL) 14, where the phase selection value (P_SEL) 14 is a 7-bit digital value that specifies one of 128 available digital phase increments across a period of a single clock cycle.

As described below, the phase selection circuit 10 is configured for solving the problem of being able to precisely subdivide a reference clock into 128 equally spaced phase positions selected by binary control signals 14. Hence, the phase selection circuit 10 can be used for digitally controlled phase alignment circuits that require the ability to continuously rotate an output phase of a given signal.

The phase selection circuit 10 includes a selection circuit 16, binary weighted current sources 18a and 18b, and an amplifier circuit 20. The selection circuit 16, which includes a decoder 22 and multiplexers 24a and 24b, is configured for receiving a prescribed number of phase signals (P0-P7) 26 that represent respective equally-spaced phases of a clock signal. As illustrated in FIG. 4, each phase signal (e.g., P1) has a separation S to an adjacent phase signal (e.g., P0 or P2) of one eighth (⅛) of a cycle (S=⅛). The phase signals (P1-P8) 26 are supplied, for example, by a poly-phase voltage-controlled oscillator (not shown), or a voltage-controlled delay line.

Figure 4:
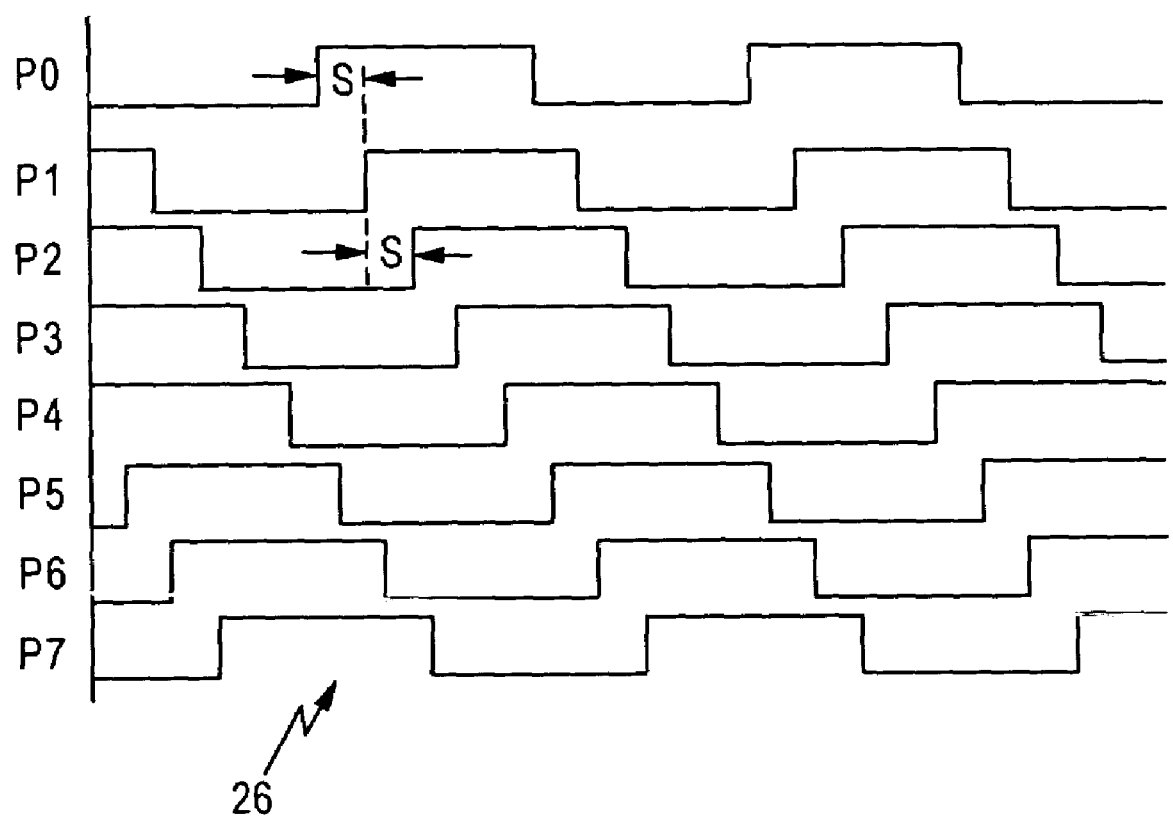
FIG. 4 is a diagram illustrating the phase signals supplied to the phase selection circuit as equally-spaced phases of a clock signal.
Figure 9:
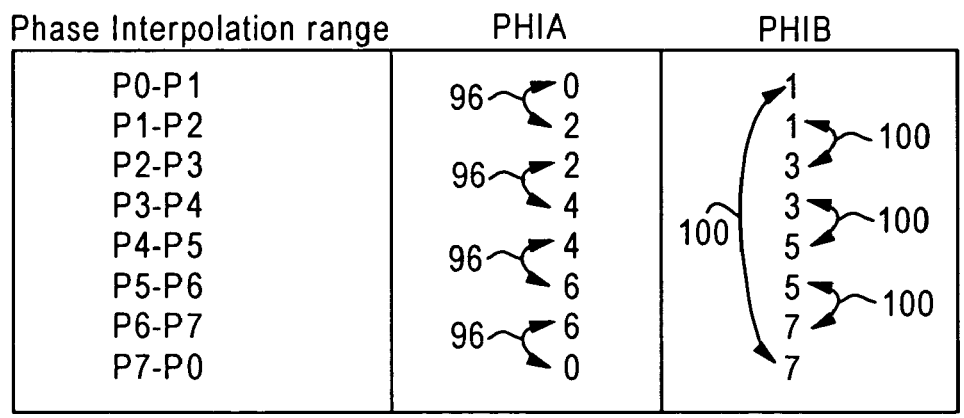
FIG. 9 is a diagram illustrating the selection of alternate phase indexes by the decoder of FIG. 3, according to an embodiment of the present invention.

The selection circuit 16 is configured for selecting and outputting, from the phase signals P0 through P7 26, a first phase signal (PHIA) 28a and a second phase signal (PHIB) 28b, where the first phase signal (PHIA) 28a and the second phase signal (PHIB) 28b are adjacent to each other as illustrated in FIG. 4 and FIG. 9, described below. In particular, each of the phase signals (PHIA) 28a and (PHIB) 28b have the same separation S of one eighth (⅛) of a cycle as illustrated in FIG. 4; hence, the phase signals (PHIA) 28a and (PHIB) 28b also are referred to herein as first and second adjacent phase signals, respectively.

The selection circuit 16 is configured such that the multiplexer 24a is configured for receiving the even index of the phase signals 26 (P0, P2, P4, P6), and the second multiplexer 24b is configured for receiving the odd index of the phase signals 26 (P1, P3, P5, P7).

The decoder 22 is configured for outputting 4-bit selection signals (SA) 30a and (SB) 30b to multiplexers 24a and 24b for selection of the first and second adjacent phase signals 28a and 28b, respectively. The decoder 22 is configured for identifying the appropriate selection signals 30a and 30b based on the received phase selection value (P_SEL) 14. In particular, the decoder 22 is configured for identifying the two phase signals 26 to which the phase selection value (P_SEL) 14 is bounded between; for example, if the phase signals P0, P1 and P2 represented respective digital phase values of "0", "15", and "31", and the phase selection value (P_SEL) 14 had a value of "P_SEL=23", then the decoder 22 would identify that the phase selection value (P_SEL=23) is between the phase signals P1 (P1=15) and P2 (P2=31). In this case, the decoder 22 would output the selection signals 30a (SA="0010") and SB 30b (SB="0001") to the multiplexers 24a and 24b for selection of the phase signals P2 and P1. as the first and second phase signals PHIA 28a and PHIB 28b, respectively.

In addition, the decoder 22 is configured for identifying a digital interpolation control value (TD) 32a that identifies the difference between the received phase selection value (P_SEL) 14 (e.g., P_SEL=23) and the selected phase signals PHIA 28a (e.g., P2=31) and PHIB 28b (e.g., P1=15). In this case, the difference between the received phase selection value (P_SEL) 14 (e.g., P_SEL=23) and PHIB 28b (e.g., P1=15) is "8", hence the decoder 22 sets the digital interpolation control value (TD) 32a equal to "8". As described below, the digital interpolation control value (TD) 32a is implemented as a thermometer encoded group of control bits, where "thermometer encoding" refers to encoding a data value as a group of monotonically increasing bits.

In particular, in "thermometer encoding" a value is incremented by transitioning only one bit from a zero to a one value; hence, a four-bit thermometer-encoded code "0000" is incremented to values "1, 2, 3, 4" by incrementing a contiguous bit in the sequence "0001", "0011", "0111", and "1111", respectively. Hence, a thermometer-decoded value (e.g., TD 32a) is defined as having a first contiguous group of bits having a true value, wherein any bits within the digital interpolation control value (TD) 32a having a false value are contiguous and separated by the first contiguous group by a single transition ("01"). As described below, the use of thermometer encoding in the digital interpolation control value TD 32a enables each bit to control a corresponding current source module (described below with respect to FIG. 6); hence, since every bit is considered a "least significant bit", use of thermometer decoding prevents rollover of a most significant bit and enables successive current source modules to be selectively enabled or disabled, resulting in a monotonic transition that prevents any discontinuity in current supply that may otherwise cause a voltage transient which in turn would cause a phase transient.

Hence, the decoder 22 outputs to the current sources 18a and 18b the digital interpolation control value TD 32a as a thermometer-encoded value. The decoder also outputs to the current sources 18a and 18b an inverse 32b (TDN) of the thermometer-encoded digital interpolation control value TD 32a. Use of the control values 32a and 32b is described in detail below with respect to FIG. 6.

In the above example it was assumed that there is no delay in the circuit 10; as apparent from the description below with respect to FIG. 7, however, a constant delay can be identified: the identified delay is compensated for by the feedback loop of FIG. 2, to ensure that the buffered signal (B_CLK) 27 matches the reference clock 168.

The binary weighted current sources 18a and 18b are configured for outputting first and second contribution currents I1 34a and I2 34b onto a summing node 36 based on the first and second adjacent phase signals PHIA 28a and PHIB 28b, respectively, and based on the digital interpolation control value TD 32a and its inverse TDN 32b. The first and second contribution currents I1 34a and I2 34b form at the summing node an interpolated signal INT 38 that is interpolated relative to the first and second adjacent phase signals PHIA 28a and PHIB 28b, the digital interpolation control value TD 32a, and its inverse 32b.

The phase selection circuit 10 also includes an amplifier circuit 20, including at least amplifiers 20a, 20b, and 20c, that are configured for outputting the interpolated signal INT 38 as the phase-interpolated clock signal PHI_X 12. The voltage of the interpolated signal INT 38 is induced at the summing node 36 based on the intrinsic capacitance of the integrated circuit between the summing node 36 and the limiting amplifier 20a; in other words, the intrinsic capacitance can be modeled by a capacitor (not shown) having a first terminal coupled to the summing node 36 and a second terminal end coupled to ground.

Figure 7:
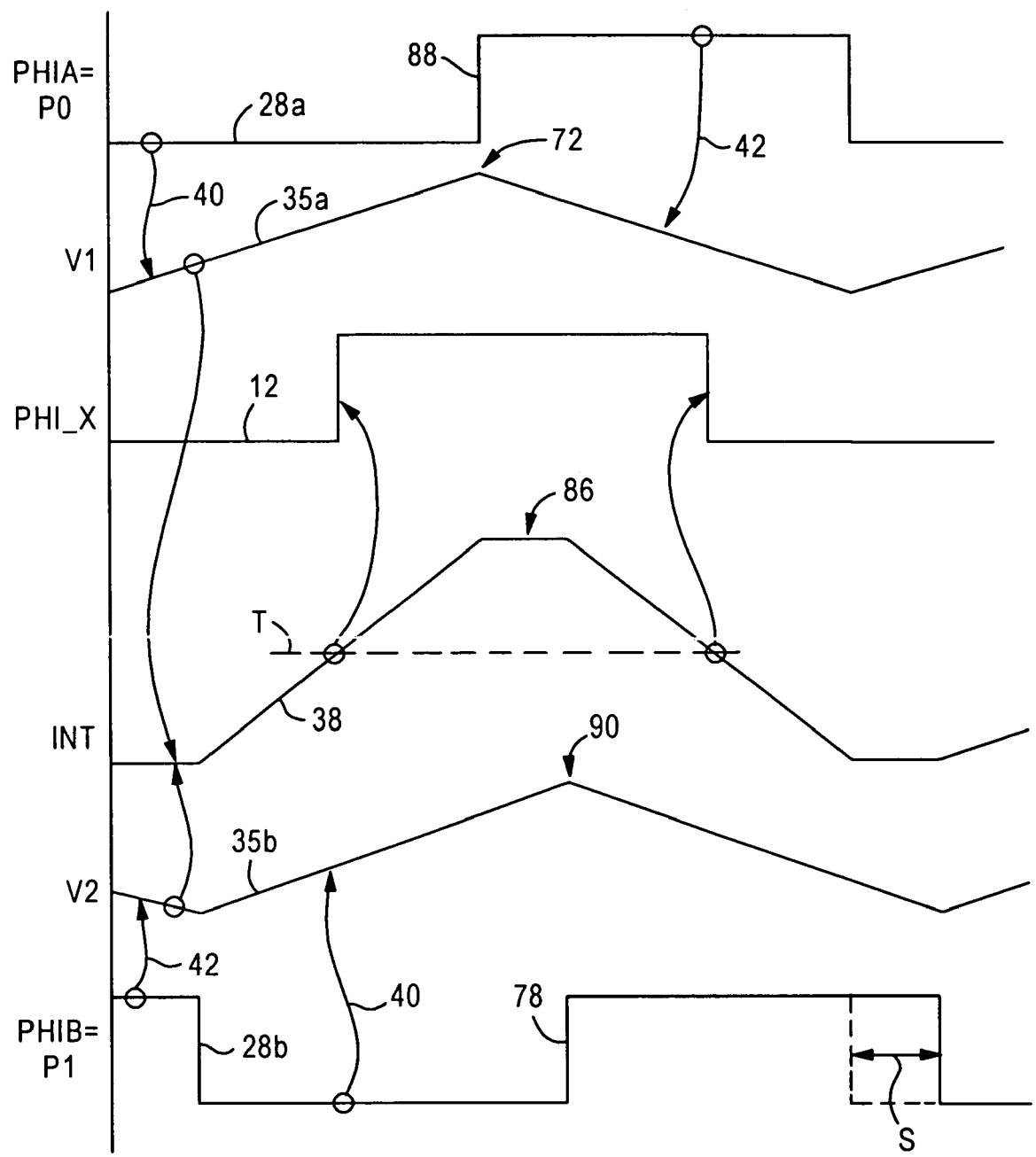
FIG. 7 is a diagram illustrating generation of the an interpolated signal used to generate the phase-interpolated clock signal by the phase selection circuit of FIG. 3.

The amplifier 20 includes a limiting amplifier 20a configured for outputting a voltage signal in response to an induced voltage of the interpolated signal INT 38 exceeding a prescribed threshold T, illustrated in FIG. 7. As recognized in the art, the threshold T for a CMOS inverter is nominally one half the reference supply voltage (VDD). Each amplifier 20a and 20b, implemented for example as a CMOS inverter, has a gain of about "10", such that the amplifiers 20a and 20b in series produce a gain of about "100". Hence, the amplifier 20b is configured for outputting the signal output of the amplifier 20a between prescribed voltage rails VDD and VSS, also referred to as first and second reference voltages. In other words, the amplifier 20b is able to generate a 1 volt (V) swing based on the amplifier 20a detecting a 0.01V volt above the threshold T. Hence, the second amplifier 20b ensures the output signal PHI_X 12 has a voltage swing between a first reference voltage VDD and a second reference voltage VSS, according to the phase selection value. The buffers 20c and 20d are configured for inverting the output signal with a unitary (e.g., "1") gain. Any variations in the threshold T (e.g., due to process variations) can be controlled by changing the slew rate of the contribution currents I1 34a and I2 34b, described below.

FIG. 7 is a diagram illustrating overall operation of the current sources 18a and 18b and the amplifier circuit 20 in generating the output signal PHI_X 12, according to an embodiment of the present invention. Assume in this example that the multiplexers 24a and 24b output the adjacent phase signals P0 and P1, respectively, and that the decoder 22 outputs a digital interpolation control value 32a having a value of "TD=8". As described in detail below with respect to FIGS. 5 and 6, each of the current sources 18a and 18b is configured for supplying the corresponding contribution current I1 34a and I2 34b to the summing node 36 in response to deassertion of the corresponding adjacent phase signal 28a and 28b, illustrated as respective voltage signals V1 35a and V2 35b at node 36, for example as illustrated with respect to event 40. Each of the current sources 18a and 18b also is configured for draining (i.e., reducing) the corresponding contribution current I1 34a and I2 34b to the summing node 36 in response to assertion of the corresponding adjacent phase signal 28a and 28b, for example illustrated with respect to the respective voltage signals V1 35a and V2 35b at event 42. As described below with respect to FIG. 5, each contribution current I1 32a and I2 32b is based on a sum total of current supplies and current drains by current source modules in each corresponding current source 18a and 18b. In addition, the current supply and current drain are performed at rates controlled by respective current control signals, described below.

The phase selection circuit 10 of FIG. 3 also includes a current magnitude controller 44 configured for controlling the current magnitude by the current source 18a and 18b in sourcing or draining the respective currents I1 32a and I2 34b. In particular, the current magnitude controller 44 is configured for controlling the current magnitude supply by outputting analog current control signals PREF 46a and NREF 46b, to the current sources 18a and 18b, based on comparing the phase-interpolated clock signal XFDBK 48 output by the buffer 20d relative to a prescribed calibration value IRC 50. The prescribed calibration value IRC 50 is supplied by a calibration circuit (not shown) configured for calibrating the integrated circuit with respect to precision resistors that are externally coupled to the integrated circuit (i.e., off-chip) and having a tolerance of about one percent (1%).

As described below with respect to FIG. 6, the current control signal PREF 46a is configured for controlling the supply of current by each current source 18a and 18b relative to the digital interpolation control value TD 32a and TDN 32b as described below, at a corresponding slew rate. The current control signal NREF 46b is configured for controlling the drain of current by each corresponding current source 18a and 18b relative to the digital interpolation control value TD 32a and TDN 32b, at a corresponding slew rate.

Hence, the current magnitude controller 44 provides a feedback control system for adjusting the current sources 18a and 18b using the current control signals PREF 46a and NREF 46b based on the feedback signal 48, and based on the calibration value IRC 50. Hence, the current magnitude controller 44 is configured for controlling a duty cycle of the phase-interpolated clock signal 38 of FIG. 7 based on controlling the first and second current control signals PREF 46a and NREF 46b.

Figure 5:
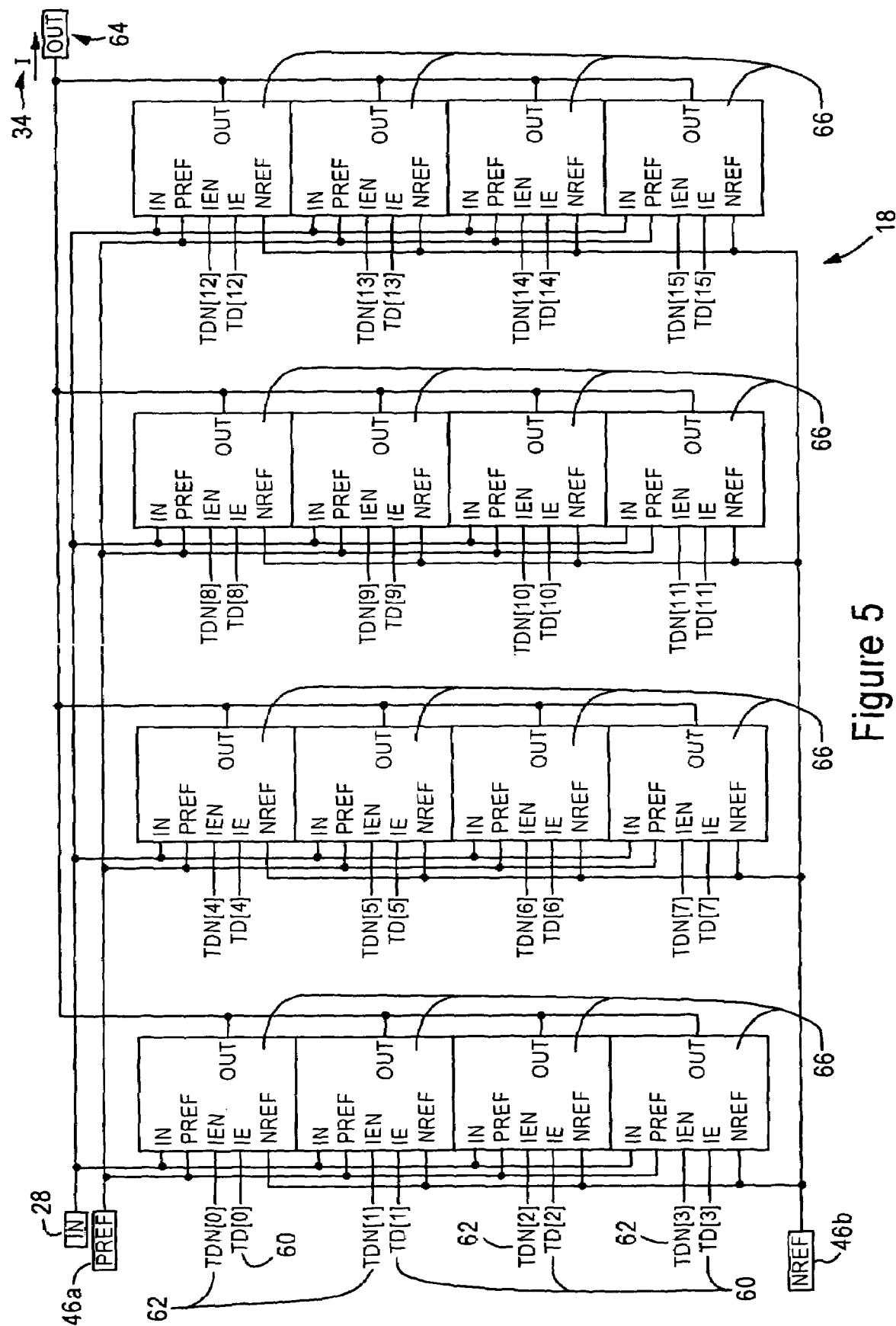
FIG. 5 is a diagram illustrating one of the binary weighted current sources of FIG. 3, including multiple current source modules, according to an embodiment of the present invention.

FIG. 5 is a diagram illustrating one of the current sources 18 (e.g., 18a or 18b), according to an embodiment of the present invention. As apparent from FIG. 3, the current sources 18a and 18b are identical in structure, and differ only in the inputs for the corresponding adjacent phase signal 28 (e.g., PHIA 28a or PHIB 28b).

Each current source 18 (e.g., 18a and 18b of FIG. 3) includes a plurality of current source modules 66. Each current source module 66 is configured for selectively contributing to the corresponding contribution current 134 (e.g., I1 34a and I2 34b of FIG. 3) based on the corresponding adjacent phase signal 28, the current control signals PREF 46a and NREF 46b, a corresponding control bit (e.g., TD[0]) 60 from the thermometer-decoded digital interpolation control value TD 32a, plus the corresponding control bit (e.g., TDN[0]) 62 from the inverse TDN 32b.

Figure 6:
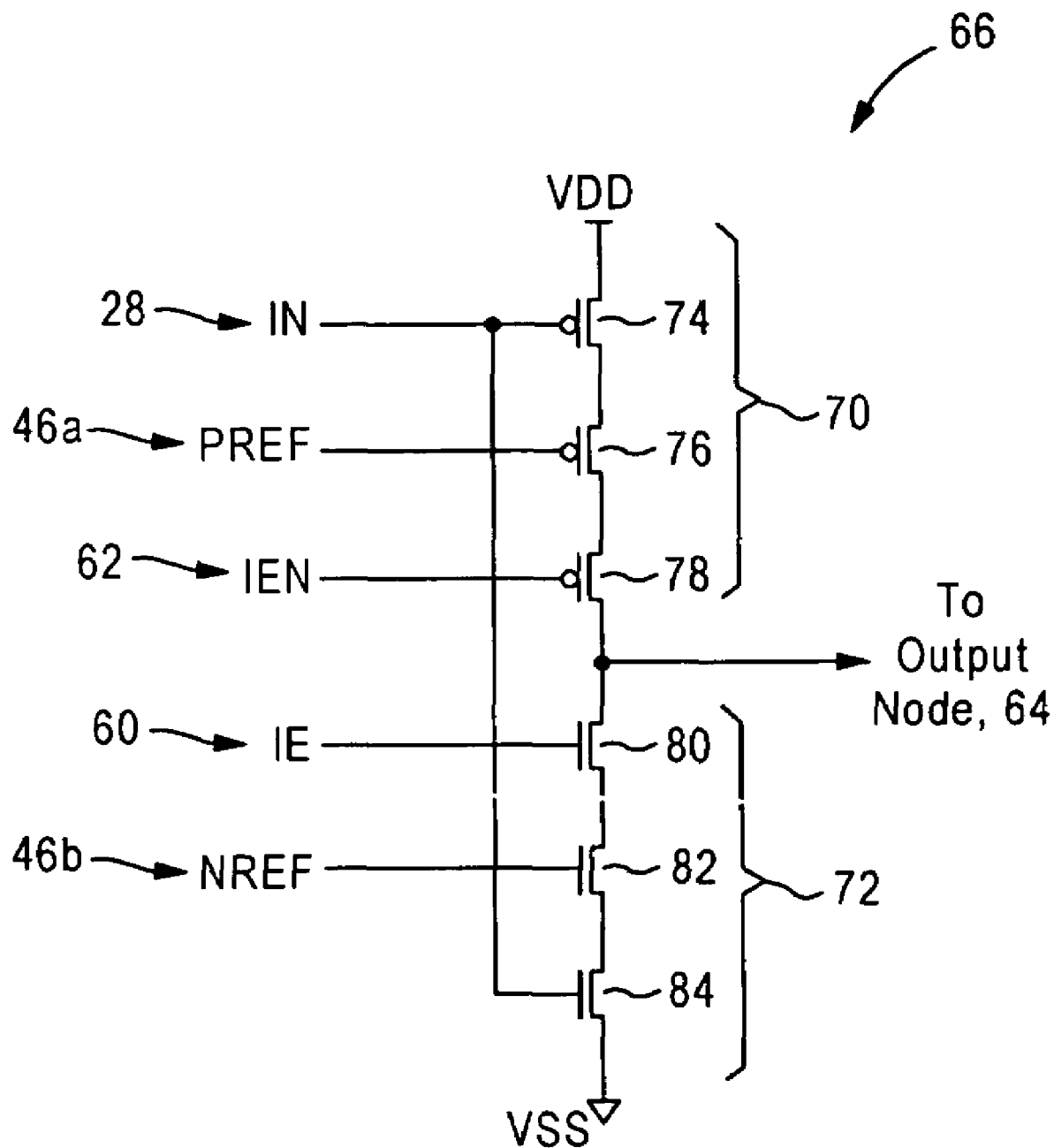
FIG. 6 is a diagram illustrating in detail one of the current source modules of FIG. 5, according to an embodiment of the present invention.

FIG. 6 is a diagram illustrating in detail a current source module 66. The current source module 66 includes a pull-up transistor circuit 70 and a pull-down transistor circuit 72. The pull-up transistor circuit 70 includes P-FET transistors 74, 76 and 78 connected in series, and the pull-down transistor circuit 72 includes N-FET transistors 80, 82, and 84 connected in series.

The P-FET transistor 74 of the pull-up transistor circuit 70 is configured for supplying the corresponding current to the summing node 36 (via output node 64) in response to deassertion of the corresponding adjacent phase signal IN 28 (IN=0). The P-FET transistor 76 is configured for supplying the corresponding current at the prescribed slew rate in response to the current control signal PREF 46a. The P-FET transistor 78 is configured for enabling the pull-up transistor circuit 78 based on deassertion of the corresponding inverse control bit 62 (IEN=0).

The N-FET transistor 84 of the pull-down transistor circuit 72 is configured for draining the corresponding current from the summing node 34 (via the output node 64) in response to assertion of the corresponding adjacent phase signal IN 28 (IN=1). The N-FET transistor 82 is configured for draining the corresponding current at the slew rate in response to the second current control signal NREF 46b, and the N-FET transistor 80 is configured for enabling the pull-down transistor circuit 72 based on the assertion of the corresponding control bit (IE=1) 60.

Hence, each current source module 66 is selectively enabled based on the corresponding control bit 60 being asserted (IE=1) and the inverse control bit being deasserted (IEN=0). As apparent from above, the current source modules 66 of the current source 18a receive the corresponding control bit 60 from the digital interpolation control value TD 32a, and the corresponding inverse control bit 62 from the inverse control value TDN 32b, whereas the current source modules 66 of the current source 18b receive the corresponding control bit 60 from the inverse digital interpolation control value TDN 32b, and the corresponding inverse control bit 62 from the digital interpolation control value TD 32a.

Consequently, each current control module 66, if enabled by its corresponding inverse enable signal 62 (IEN=0), sources (i.e., supplies) current to the summing node 36 at the slew rate controlled by the current control signal PREF 46a, based on the corresponding input signal IN 28 being deasserted; each current control module 66 that is enabled (IE=1) drains (i.e. removes) current from the summing node 36 at the slew rate controlled by the current control signal NREF 46b, based on the corresponding input signal IN 28 being asserted.

As apparent from the foregoing, the combination of current modules 66 in each current source 18 enables a linear increase or decrease in the current supply 134 by the current source 18 to its corresponding output node 64 based on the number of its internal current source modules 66 that are enabled by the respective control bits 60 of the thermometer-decoded digital interpolation control values TD 32a (for current supply 18a), or conversely the inverse bits 62 of the inverse value TDN 32b (for current supply 18b). Consequently, the interpolation control values TD 32a and TDN 32b are used to control the weighting of the adjacent phase signals PHIA 28a and PHIB 28b in determining an interpolated value 38. In addition, the current control signals PREF 46a and PREF 46b are used to control the slew rate of the current signals 34a and 34b in order to maintain a 50% duty cycle.

As illustrated in FIG. 7, an equal contribution by both current sources 18a and 18b based on the interpolation control value 32a having an equal weighting relative to the inverse 32b (e.g., TD=000000011111111 and TDN= 111111111100000000) results in an interpolated signal 38 having a voltage peak 86 equidistant between the peaks 88 and 90 of the signals V1 and V2, respectively, and the rising edges of the phase signals 28a and 28b, respectively. An unequal weighting, due to a change in the interpolation control values TD 32a and TDN 32b, will skew the interpolated signal 38 toward the higher-weighted phase signal 28a or 28b, causing a corresponding phase shift in the output signal PHI_X 12.

Hence, a digital precise interpolation control can be implemented without introducing voltage spikes due to transients that may be interpreted as a runt pulse by pulse detection circuitry. As described above, the decoder 22 in implementation will adjust for the delay introduced between the peak 86 and the intended phase shift, ensuring that the output signal PHI_X 12 will match the phase selection value P_SEL 14. In addition, the current magnitude controller 44 adjusts the control signals 46a and 46b to ensure precise alignment of the output signal PHI__xX 12 relative to the amplifier threshold T.

Figure 8:
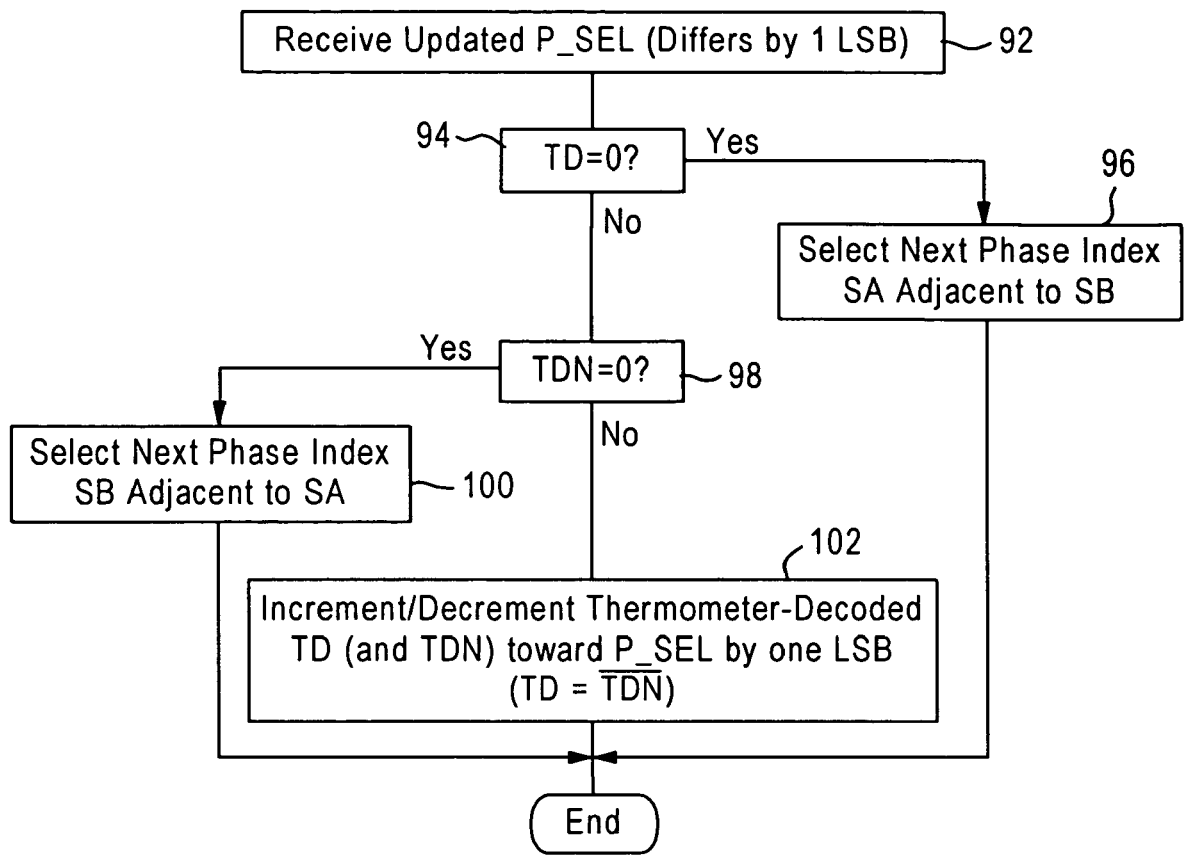
FIG. 8 is a diagram illustrating operations by the decoder of FIG. 3 in selecting a new selection signal or a new digital interpolation control value in response to an updated phase selection value.

FIG. 8 is a diagram illustrating operation of the decoder 22 in response to an increment or a decrement in the phase selection value P_SEL 14. As described above, the decoder outputs the interpolation values 32a, 32b and the selection values 30a, 30b in a manner that ensures that the number of current modules 66 that are enabled increases or decreases monotonically, ensuring linear changes in the current and voltage signals to prevent any voltage spikes.

In response to receiving an updated phase selection value P_SEL (that differs by only one least significant bit to minimize transients) in step 92, the decoder 22 checks in step 94 if the digital interpolation control value TD 32a equals zero.

If the decoder 22 determines that the control value TD 32a equals zero, indicating no current is being supplied by the current source 18a, the decoder 22 selects in step 96 the next phase index SA 30a that is adjacent to SB 30b, illustrated for example in FIG. 9 as event 96. Hence, the decoder 22 selects an alternate phase index 30a depending on the complementary phase index SB 30b of the complementary adjacent phase signal PHIB 28b.

If in step 94 the decoder 22 determines that the control value TD 32a does not equal zero, the decoder checks in step 98 whether the inverse control value TDN 32b equals zero, indicating no current is being supplied by the current source 18b. If the inverse control value TDN 32b equals zero, the decoder 22 selects in step 100 the next phase index SB 30b that is adjacent to SA 30a, illustrated for example in FIG. 9 as event 100. Hence, the decoder 22 selects an alternate phase index SB 30b depending on the complementary phase index SA 30a of the complementary adjacent phase signal PHIA 28a.

Hence, a phase index 30a or 30b is changed only if the corresponding current source 18a or 18b is disabled, to ensure no transients are introduced to the summing node 36.

If in step 98 neither TD 32a or TDN 32b are zero, then the decoder 22 increments/decrements the thermometer decoded interpolation control value TD 32*a* (and the corresponding inverse TDN 32*b*) in step 102 toward the phase selection value P_SEL by setting or resetting a single bit of the thermometer decoded values TD 32*a* and TDN 32*b*, accordingly.

According to the disclosed embodiment, digital phase control is implemented based on selecting two adjacent input phases, and modulating two binary weighted current sources based on the respective adjacent input phases. The binary weighting is implemented using thermometer-decoded digital interpolation control values, insuring that any current change is linear to prevent discontinuities that may cause phase glitches. The result between the two current sources is a triangular waveform that has a phase that is interpolated between the two selected input phases.

In addition, a duty cycle feedback loop modulates the pull-up current mirror in each current source to avoid duty cycle distortion across the phase, voltage, and temperature variations during operation, as well as due to any changes in phase selection. The pull-down current mirror in the current sources use an on-chip calibrated current reference that ensures the voltage ramp on the summing node does not saturate nor have insufficient voltage swing for the output amplifier.

These features enable implementation of a phase alignment circuit that can be optimized independently from the requirements of aligning the on-chip clock to an external reference, since on-chip multiplying PLLs are no longer needed. Hence, phase alignment can be precisely controlled to within 4.8 picoseconds, well within the range of jitter that is normally encountered by the received reference clock, for example 20 picoseconds.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. An integrated circuit having a phase alignment circuit, the phase alignment circuit comprising:
   a phase selection circuit configured for outputting a local clock signal as a phase-adjusted local clock having a selected phase based on a phase selection value;
   a synchronizer configured for digitally sampling a received reference clock of a synchronous communications system relative to the phase-adjusted local clock, and outputting a digital phase bit identifying whether the phase-adjusted local clock has a later phase relative to the received reference clock; and
   a counter configured for selectively performing one of incrementing or decrementing a counted value based on the digital phase bit, the counted value having a first prescribed number of bits, the counter configured for outputting to the phase selection circuit a prescribed number of most significant bits from the counted value as the phase selection value, the prescribed number of most significant bits from the counted value less than the first prescribed number of bits, the phase selection circuit configured for aligning the phase-adjusted local clock toward the received reference clock based on the phase selection value, wherein the phase selection value specifies one of a plurality of available digital phase increments across a period of a single clock cycle.

2. The integrated circuit of claim 1, wherein the synchronizer is configured for resolving any metastability between the received reference clock and the phase-adjusted local clock signal, the synchronizer including a first flip-flop configured for sampling the received reference clock relative to the phase-adjusted local clock signal, a second flip-flop configured for sampling an output of the first flip-flop relative to the phase-adjusted local clock signal, and a third flip-flop configured for sampling an output of the second flip-flop relative to the phase-adjusted local clock signal, the third flip-flop outputting the digital phase bit.

3. The integrated circuit of claim 2, wherein the phase alignment circuit further includes a programmable divider circuit configured for dividing the phase-adjusted local clock signal into a frequency-selected clock signal, based on a prescribed rate input, the frequency-selected clock signal having a phase coincident with the phase-adjusted local clock signal and a frequency matching the received reference clock.

4. The integrated circuit of claim 3, wherein the integrated circuit further includes:
   a buffer circuit configured for outputting the frequency-selected clock signal as a clock input to the first, second, and third flip-flops, and to bus registering circuitry;
   wherein the received reference clock is based on outputting an output reference clock from the integrated circuit that is synchronous with the local clock signal, the received reference clock being the output reference clock having encountered a prescribed propagation path.

5. The integrated circuit of claim 1, wherein the phase selection circuit is configured for the setting the phase-adjusted local clock based on the phase selection value according to a negative feedback loop.

6. The integrated circuit of claim 5, wherein the phase selection circuit includes:
   a selection circuit configured for receiving a first prescribed number of phase signals representing respective equally-spaced phases of the local clock signal, the selection circuit configured for selecting and outputting, from the first prescribed number of phase signals, first and second adjacent phase signals based on the phase selection value and that represents one of a second prescribed number of phases, the second prescribed number a multiple of the first prescribed number, the selection circuit further configured for outputting a digital interpolation control value based on the phase selection value relative to the first and second adjacent phase signals;
   first and second binary weighted current sources configured for outputting first and second contribution currents onto a summing node based on the first and second adjacent phase signals, respectively, and based on the digital interpolation control value, the first and second contribution currents forming at the summing node an interpolated signal that is interpolated relative to the first and second adjacent phase signals and the digital interpolation control value; and
   an amplifier circuit configured for outputting the interpolated signal as the phase-adjusted local clock, having a voltage swing between a first reference voltage and a second reference voltage, according to the phase selection value.

7. The integrated circuit of claim 6, further comprising a current magnitude controller configured for controlling a current magnitude supply by each of the first and second binary weighted current sources, the current magnitude controller controlling the current magnitude supply based on comparing the phase-interpolated clock signal relative to a prescribed calibration, wherein:

the current magnitude controller is configured for outputting first and second current control signals to each of the first and second binary weighted current sources, the first current control signal configured for controlling a supply of current, by each corresponding first and second binary weighted current source and relative to the digital interpolation control value, at a corresponding first rate to the summing node, the second current control signal configured for controlling a drain of current by each corresponding first and second binary weighted current source and relative to the digital interpolation control value, at a corresponding second rate from the summing node, the current magnitude controller is configured for controlling a duty cycle of the phase-interpolated clock signal based on the controlling the first and second current control signals.

8. The integrated circuit of claim 7, wherein the selection circuit includes:

a decoder configured for outputting the digital interpolation control value as a thermometer encoded group of control bits and an inverse digital interpolation control value as a digital inverse of the digital interpolation control value, the decoder further configured for selecting first and second selection signals identifying the first and second adjacent phase signals relative to the phase selection value;

a first multiplexer configured for selecting the first adjacent phase signal, from among an even index of the phase signals, in response to the first selection signal; and a second multiplexer configured for selecting the second adjacent phase signal, from among an odd index of the phase signals, in response to the second selection signal.

9. The integrated circuit of claim 1, wherein the selection circuit is configured for receiving a first prescribed number of phase signals representing respective equally spaced phases of the local clock signal, the selection circuit configured for generating the local clock signal, in response to the phase selection value, based on one of selecting one of the phase signals or interpolating first and second adjacent ones of the phase signals.

10. A method in an integrated circuit, the method comprising:

receiving a received reference clock of a synchronous communications system at a pad of the integrated circuit, the pad providing a contact interface for the integrated circuit with a trace configured for supplying the received referenced clock;

outputting, by a phase selection circuit in the integrated circuit, a phase-adjusted local clock in response to a local clock signal and a phase selection value, the phase selection circuit configured for outputting the local clock signal as the phase-adjusted local clock and having a selected phase based on the phase selection value, the outputting including aligning the phase-adjusted local clock toward the received reference clock based on the phase selection value;

digitally sampling the received reference clock, by a synchronizer in the integrated circuit, relative to the phase-adjusted local clock, and outputting by the synchronizer a digital phase bit identifying whether the phase-adjusted local clock has a later phase relative to the received reference clock;

selectively performing one of incrementing or decrementing of a counted value by a counter based on the digital phase bit, the counted value having a first prescribed number of bits; and outputting from the counter to the phase selection circuit a prescribed number of most significant bits from the counted value as the phase selection value, the prescribed number of most significant bits from the counted value less than the first prescribed number of bits, wherein the phase selection value specifies one of a plurality of available digital phase increments across a period of a single clock cycle.

11. The method of claim 10, wherein the digitally sampling includes resolving any metastability between the received reference clock and the phase-adjusted local clock signal by the synchronizer, the synchronizer including first, second, and third flip-flops, the digitally sampling further including:

sampling the received reference clock relative to the phase-adjusted local clock signal by the first flip-flop, sampling an output of the first flip-flop relative to the phase-adjusted local clock signal by the second flip-flop, sampling an output of the second flip-flop relative to the phase-adjusted local clock signal by the third flip-flop, and outputting the digital phase bit by the third flip-flop.

12. The method of claim 11, further comprising dividing the phase-adjusted local clock signal into a frequency-selected clock signal by a programmable divider circuit based on a prescribed rate input, the frequency-selected clock signal having a phase coincident with the phase-adjusted local clock signal and a frequency matching the received reference clock.

13. The method of claim 12, further comprising:

outputting the frequency-selected clock signal by a buffer circuit as a clock input to the first, second, and third flip-flops, and to bus registering circuitry;

outputting an output reference clock from the integrated circuit that is synchronous with the local clock signal, the received reference clock being the output reference clock having encountered a prescribed propagation path.

14. The method of claim 10, wherein the step of outputting the phase-adjusted local clock includes setting the phase-adjusted local clock based on the phase selection value according to a negative feedback loop.

15. The method of claim 10, wherein the outputting by the selection circuit includes:

receiving a first prescribed number of phase signals representing respective equally spaced phases of the local clock signal, and generating the local clock signal, in response to the phase selection value, based on one of selecting one of the phase signals or interpolating first and second adjacent ones of the phase signals.

* * * * *